United States Patent

[11] 3,633,673

[72] Inventor Martin B. Conrad
  Carpinteria, Calif.
[21] Appl. No. 47,420
[22] Filed June 18, 1970
[45] Patented Jan. 11, 1972
[73] Assignee Baker Oil Tools, Inc.
  Commerce, Calif.
  Division of Ser. No. 823,030, May 8, 1969,
  Pat. No. 3,572,433

[54] THROUGH-TUBING CEMENTING METHOD
  7 Claims, 16 Drawing Figs.
[52] U.S. Cl. .................................................. 166/291
[51] Int. Cl. ............................................... E21b 33/16
[50] Field of Search ............................................ 166/285,
  289-291, 135, 132, 153-156

[56] References Cited
  UNITED STATES PATENTS
1,576,074 3/1926 Thomas ...................... 166/156
2,330,659 9/1943 Anderson ..................... 166/132
2,481,422 9/1949 Haynes et al. ................. 166/153 X
2,591,603 4/1952 Ragan ......................... 166/290 X
2,599,386 6/1952 Haynes ........................ 166/154
2,630,179 3/1953 Brown ......................... 166/291
3,213,940 10/1965 Wood .......................... 166/291 X Primary Examiner—Ian A. Calvert
Attorney—Bernard Kriegel ABSTRACT: The method of cementing a porous subsurface earth formation in which well-casing is set and perforated, wherein a body of cement slurry is displaced through the tubing, and a bridge plug is employed to close off the lower end of the tubing, following displacement of the cement slurry through the perforations.

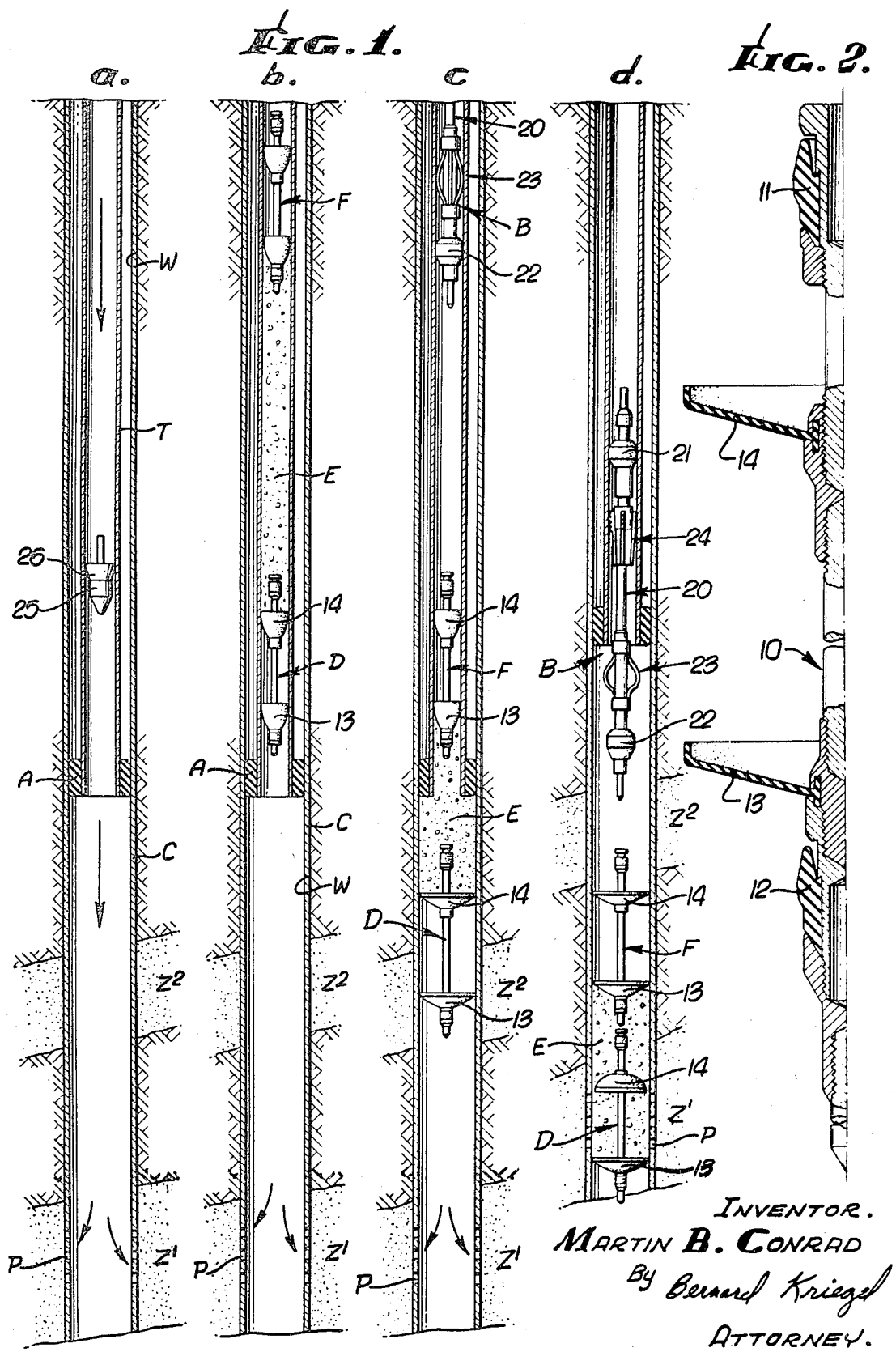

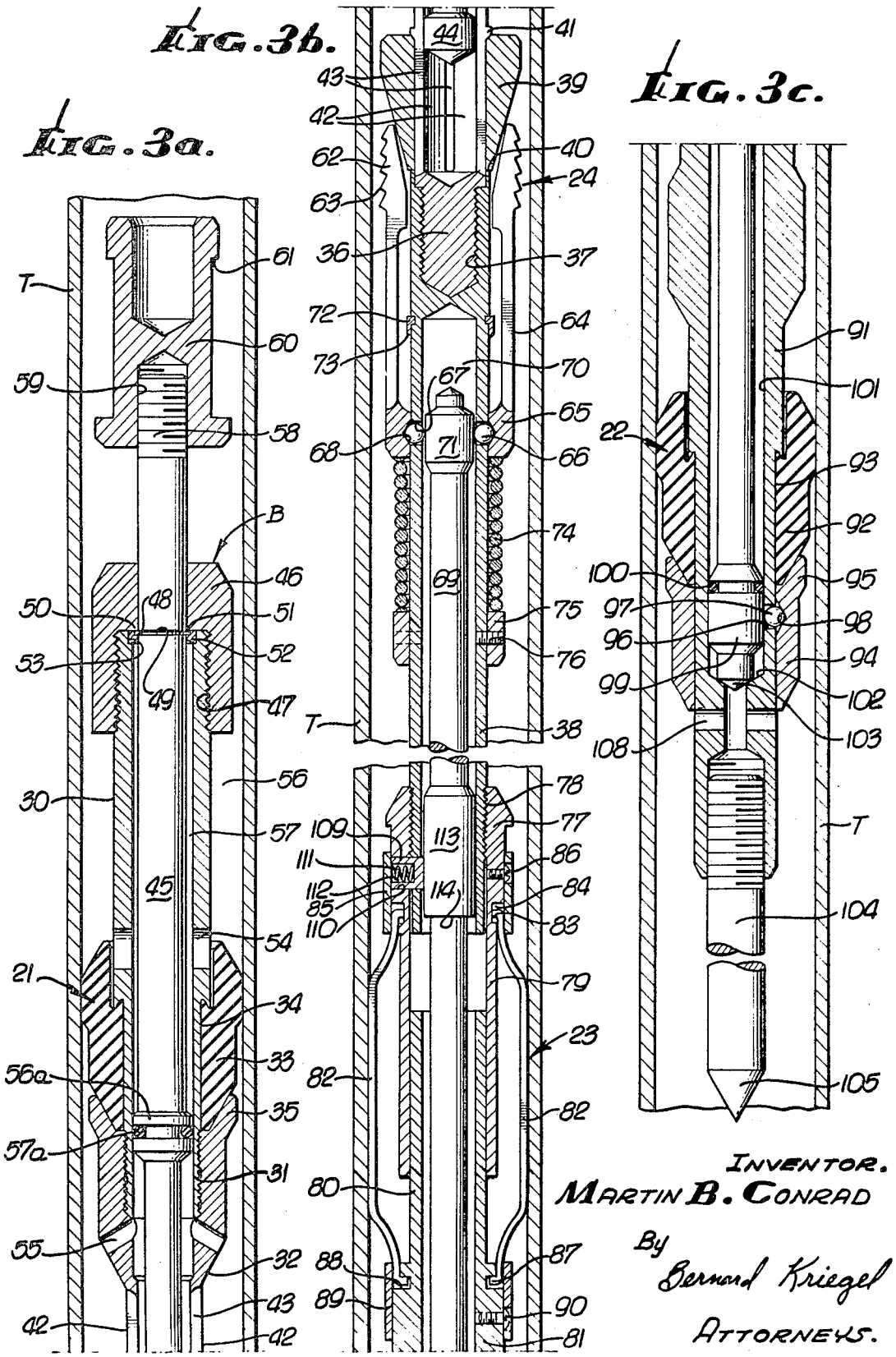

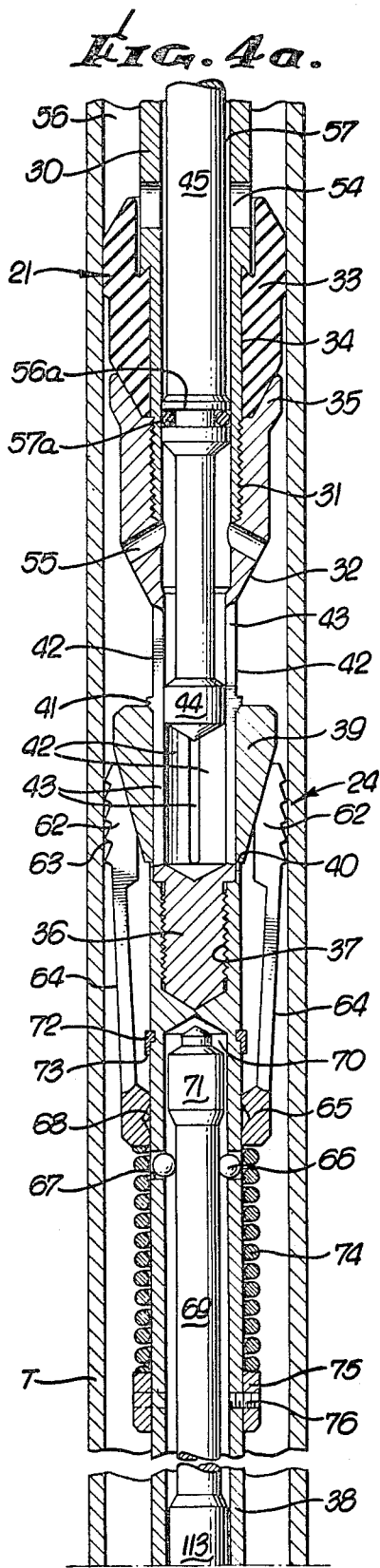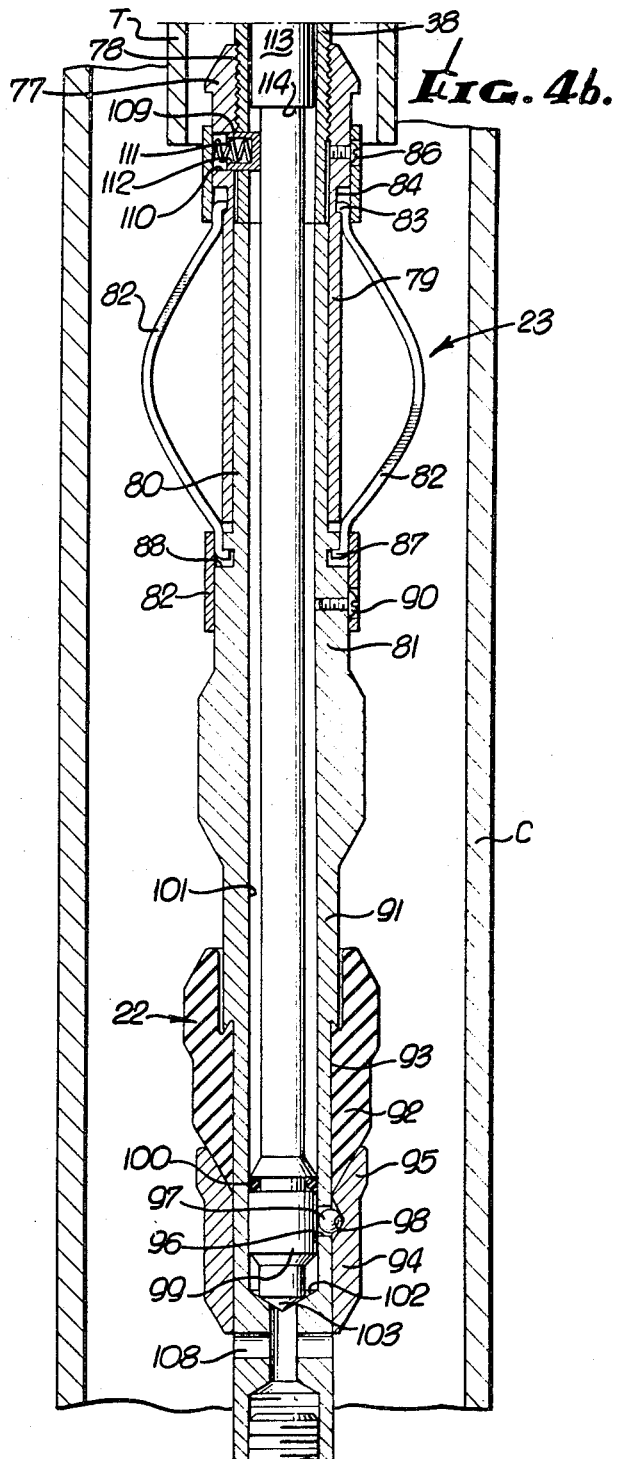

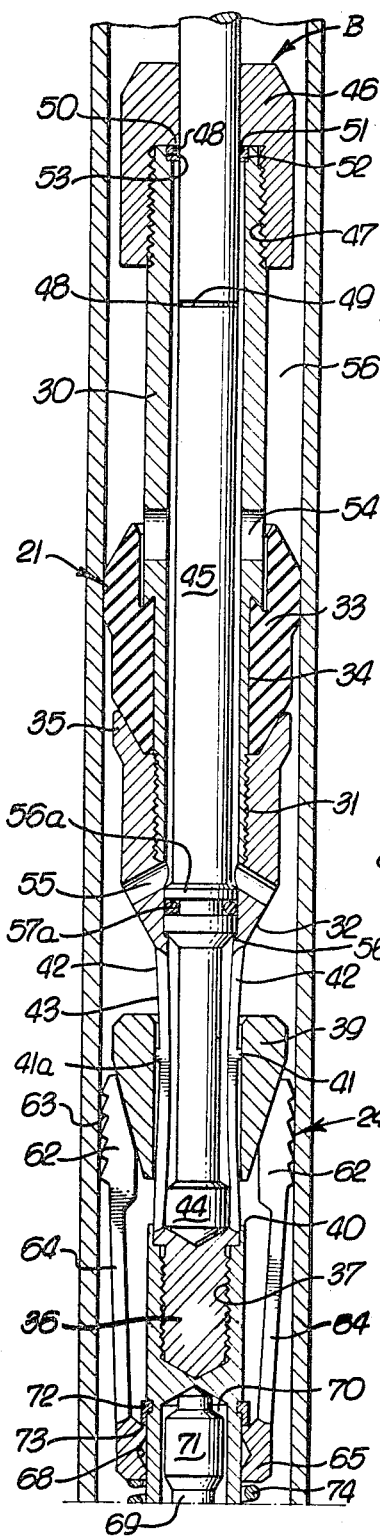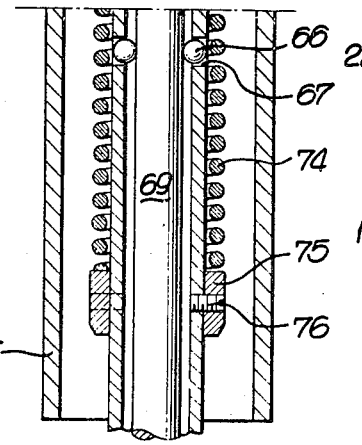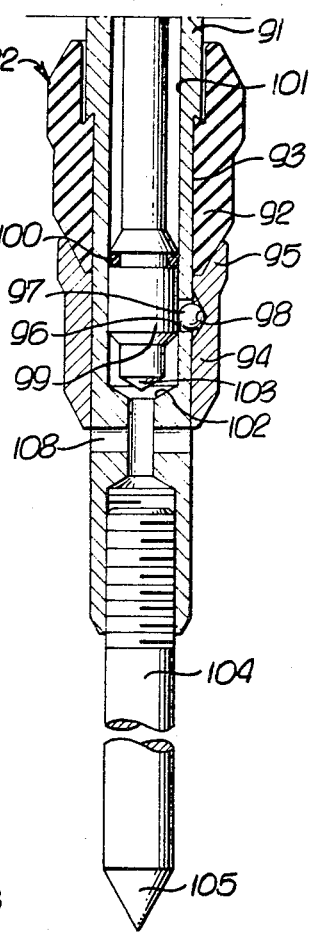

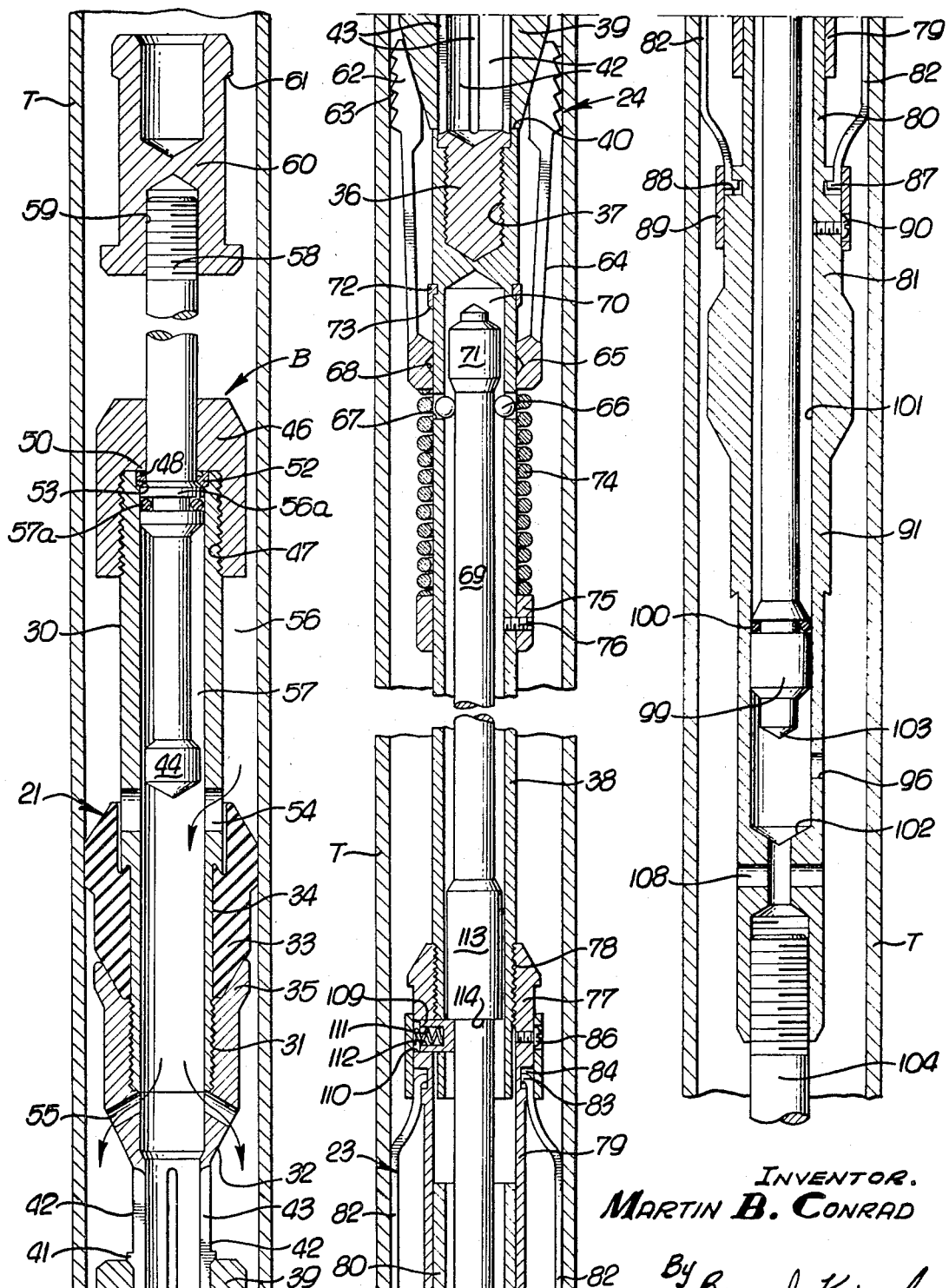

THROUGH-TUBING CEMENTING METHOD

The present application is a division of my application for "Through Tubing Cementing Method and Apparatus," filed May 8, 1969, Ser. No. 823,030 now U.S. Pat. No. 3,572,433.

In the completion or treatment of certain oil and gas wells, it may be necessary or desirable to displace a pumpable cement slurry into a porous formation in which casing has been set and perforated. However, if well tubing is disposed in the well casing, the displacement of the cement downwardly through the well tubing and thence into the larger casing poses problems which are difficult to solve. One of these problems would be the provision of a cementing plug capable of being displaced downwardly through the small diameter tubing and also being capable of outward expansion into engagement with the larger diameter casing, so that a following fluid, which is normally employed to displace the cement slurry, will not bypass the cement slurry and itself be displaced into the formation being cemented, on the one hand, and which, on the other hand, will prevent the return flow of the cement from the formation.

The present invention provides a method for cementing wells of the aforementioned type where the cement slurry is to be displaced through tubing and thence into a larger diameter casing which has been perforated to establish communication between the casing and a porous formation.

More specifically, the invention provides a method whereby a body of cement slurry is introduced into the well tubing and is displaced downwardly through the tubing by a following fluid, wherein a plug device is pumped downwardly through the tubing in the following fluid at a distance above the cement slurry, calculated to effect displacement of the cement through the casing perforations and into the porous formation, or to fill the casing to a predetermined point below the tubing, the plug being anchored at the lower extremity of the tubing following displacement of the cement to prevent further fluid displacement and to prevent return flow of the cement from the formation into the casing. The cement may then be allowed to set up in the formation, after which the plug is removed from the tubing. Thereafter, various through tubing operations may be performed, such as, for example, the perforation of a higher subsurface zone traversed by the casing. In the practice of the present method, the usual through tubing plugs or dividers may be employed to separate the charge of cement slurry from fluid in advance of the cement slurry and the displacement fluid following the charge of cement slurry.

This invention possesses many other advantages, and has other purposes which may be made more clearly apparent from a consideration of a method embodying the invention. This method is shown and described in the present specification and in the drawings accompanying and constituting a port thereof. It will now be described in detail, for the purpose of illustrating the general principles of the invention; but it is to be understood that such detailed description is not to be taken in a limiting sense.

Referring to the drawings:

FIG. 1a, 1b, 1c and 1d, respectively, illustrate operational steps in cementing a zone in a cased well by pumping cementitious material through tubing disposed in the well casing;

FIG. 2 is a vertical section through a separation plug employed in the practice of the method;

FIGS. 3a, 3b and 3c together constitute a vertical section through a tubing plug embodying the invention, and being run through the tubing, FIGS. 3b and 3c being, respectively, downward continuations of FIG. 3a;

FIGS. 4a and 4b together constitute a vertical section illustrating the tubing plug anchored in the tubing following emergence of its spring actuator from the lower end of the tubing, FIG. 4b being continuation of FIG. 4a;

FIGS. 5a, 5b and 5c together constitute a vertical section illustrating the tubing plug being released from the tubing, FIGS. 5b and 5c, respectively, being a downward continuation of FIG. 5a; and FIGS. 6a, 6b and 6c together constitute a vertical section illustrating the tubing plug being pulled upwardly through the tubing following release of the plug, FIGS. 6b and 6c, respectively, being downward continuations of FIG. 6a.

As seen in FIGS. 1a, 1b, 1c and 1d, the present invention involves the treatment or cementing of a well wherein a well casing C has been set in a well bore W which traverses a subsurface strata or zone Z1. The casing has been perforated at P to provide communication between the casing C and the zone Z1. Above the zone Z1, the casing C also traverses a second zone Z2, but the casing has not been perforated at the zone Z2. Extending downwardly from the top of the well from the casing C is a tubing string T, at or near the lower end of which a conventional packer A is set and anchored against the casing to provide a seal between the tubing T and the casing C. If the formation or zone Z1 is, for example, a porous but nonproductive formation, it may be necessary or desirable to displace cement slurry into the formation or zone Z1 through the perforations P in order to block off or seal such formation. Thereafter, the casing C may be perforated at the productive formation or zone Z2.

The conduct of such cementing operation through the tubing string where, as in the present case, the formation Z1 is porous poses problems of accurate fluid and cement slurry measurement to appropriately block off the zone Z1. Various through tubing-cementing operations have heretofore been employed, but such operations have not been altogether satisfactory.

In accordance with the present method, the cementing of the formation or zone Z1 through the perforations P involves the utilization of a bridge plug or tubing plug B adapted to form a seal within the tubing T and to move with a stream of following fluid employed to displace the cement through the perforations P, the cement being, in the specifically illustrated embodiment, preceded by a separation plug or fluid divider, generally denoted at D. The body of cement slurry is indicated at E. Also, in the illustrated employment, the body of cement slurry E is separated from the following fluid in the fluid column by an upper separator or divider plug F which may correspond to the plug D.

The details of the separation plugs or dividers D and F will be best understood upon reference to FIG. 2, while the details of the tubing plug B will best be understood upon reference to FIGS. 3a through 6c.

The known type of plug or fluid divider illustrated in FIG. 2 is used for the leading separation plug D and also for the following plug F. More particularly, the separation plug comprises an elongated mandrel 10 composed of threadedly interconnected sections adapted to support thereon an upper, upwardly facing tubing cup 11 and a lower, upwardly facing tubing cup 12, each of which is adapted for sliding and sealing engagement with the inside well of the tubing string T. Between the tubing cups 11 and 12 and suitably attached to the mandrel 10 is a lower, upwardly facing casing cup 13 foldable in the tubing string T and of sufficient diameter as to expand outwardly into engagement with the inside wall of the casing C upon the emergence of the cup 13 from the tubing T. Above the casing cup 13, but below the tubing cup 11, is an upper, upwardly facing casing cup 14 foldable in the tubing T and which is also of sufficient diameter as to expand outwardly into sealing contact with the casing C upon its emergence from the tubing T. The casing cups 13 and 14 are relatively flexible, constituting simply dividers for separating the fluent material thereabove from the fluidlike material therebelow in the tubing T and in the casing C. However, the cups 13 and 14 are not required to withstand any substantial differential fluid pressure as they move downwardly with he combined fluid column.

As will be hereinafter more fully described, the tubing plug B includes an elongate body 20 on which are upper and lower tubing cups 21, 22 adapted for sliding engagement within the wall of the tubing T. On the body 20 of the tubing plug B is an actuator assembly 23, including bow springs which are held in deformed condition, as seen in FIG. 1c, when the plug B is within the tubing T, but which expand, as seen in FIG. 1d, when they emerge from the lower end of tubing T. The actuator means 23 is adapted to effect the anchoring of releasable anchor means 24 against the wall of the tubing T following emergence of the actuator means 23 from the lower end of the tubing T. Following completion of the cementing operation, the tubing plug B is removed from the tubing T.

With the foregoing general description in mind, the practice of the present method will now be described. As seen in FIG. 1a and as indicated by the arrows, a column of fluid in the tubing T and in the casing C may flow downwardly and through the casing perforations P into the zone Z1. In order to assure that the tubing T has no restrictions, offering impediment to the completion of the operation, a drift plug 25 having a cup 26 slidably engageable within the tubing T may be displaced downwardly through the tubing T and into the casing C, thereby assuring a minimum diameter opening downwardly through the tubing T.

Thereafter, at the top of the well, the separator or divider plug D is introduced into the fluid column in the tubing T followed by the body of cement slurry E. Above the cement slurry E, the upper separation plug F is introduced into the tubing T, followed by displacement fluid, which is pumped downwardly through the tubing T to effect the downward displacement of the body of cement slurry E and the plugs D and F, the plugs D and F effectively isolating the cement slurry from the fluid in advance thereof and the displacement fluid thereabove, as seen in FIG. 1b.

A suitable interval above the upper separation plug F, the tubing plug B is introduced into the tubing T, to be pumped downwardly therein with the displacement fluid. As the lower separation plug D emerges from the lower end of the tubing T, the plug cups 13 and 14 expand outwardly into sliding engagement with the larger diameter casing C, as seen in FIG. 1c. The plug D thereafter functions as a divider between the fluid in advance of the cement slurry E and the cement slurry itself. As seen in FIG. 1d, the upper divider plug F then emerges from the lower end of the tubing T and its cups 13 and 14 expand into sliding engagement with the casing C, so that the plug F acts as a divider between the following fluid above the plug F and the body of cement slurry E as the column of fluid continues to move downwardly through the well casing C.

Such further downward movement of the column of fluid in the well causes the lower separator plug D to reach a point at which at least the lower cup 13 is below the lowermost perforations P, at which time further downward movement of the bottom separator plug D is arrested, due to the presence of a static column of fluid in the casing C below the perforations P. However, the cement slurry E will continue to be displaced downwardly past the upper casing cup 14 of the separation plug D, and outwardly through the perforations P, by the following fluid above the separation plug F. Such displacement of the cement slurry E will continue until the tubing plug B reaches the lower end of the tubing string T; whereupon the actuator means 23 of the tubing plug B emerges from the lower end of the tubing T and effects anchoring of the anchor means 24 against the tubing, arresting further downward movement of the tubing plug B.

Anchoring of the tubing plug B will be indicated by a substantial increase in pressure at the top of the well, whereupon pumping of the following fluid ceases, the tubing T being shut in at the surface to hold the cement slurry E in the formation Z1 or in the casing immobile until the cement has had an opportunity to set. Thereafter, as will be more fully explained hereinafter, the tubing plug B may be removed from the tubing T. After removal of the tubing plug B, the casing C at the upper subsurface zone Z2 may be perforated, if desired, by the usual through tubing perforating equipment.

Referring now to FIGS. 3a through 6c, the structure of the tubing plug B will be more fully described.

The tubing plug B comprises an elongate, sectional, tubular body comprising an upper body section 30 which is threadedly connected, as at 31, in a threaded bore of an intermediate body section 32. Disposed upon the body 30 is an upwardly facing sealing means or packing cup 33 sealingly engaged against an annular seat 34 provided on the body section 30 and by an upwardly and outwardly extended flange 35 at the upper extremity of the intermediate body section 32.

The intermediate body section 32 extends downwardly and has a threaded lower end 36 engaged in the threaded bore 37 of a lower body section 38. An expander cone 39 is disposed about the intermediate body section 32 adjacent the lower end of the latter. In the running-in condition of the plug, as shown in FIGS. 3a through 3c, the expander cone 39 is confined against axial movement relative to the body section 32 between an upwardly facing shoulder 40 provided at the upper extremity of the lower body section 38 and a number of outstanding tapered projections 41 on the intermediate body section 32, these projections 41 being formed on circumferentially spaced resilient body webs or arms 42 which are provided by forming longitudinal slots 43 in circumferentially spaced relation about the body section 32.

The webs 42, when the tool is in the running-in condition, are held against inward flexure by a cylindrical end portion or head 44 of a center rod 45 extending longitudinally within the body sections 32 and 30 and projecting through a top cap 46 threadedly connected, as at 47, to the upper end of the upper body section 30. This rod 45 is releasably secured within the upper body section 30 by a shearable ring 48 disposed an annular groove 49 in the rod 45, and extending into a circumferential groove 51 defined between a shoulder 50 in the end cap 46 and a split retainer ring 52 disposed in a counterbore 53 in the upper end of the body section 30.

A set of upper bypass ports 54 extend radially in the tubular upper body section 30 above the packing cup 33, a set of lower bypass ports 55 extending radially through the upper end of the intermediate body section 32. These ports 54 and 55 establish communication between the annulus 56 surrounding the body of the tubing plug and the bore 57 extending longitudinally of the body of the plug B. In order to prevent communication between the bore 57 above the cup 33 and the bore below the cup 33, the rod 45 has a cylindrical section 56a provided with a suitable side seal 57a in the form of an O-ring sealingly engaged within the bore 57. Thus, fluid above the plug assembly B may be pumped downwardly through the tubing T and will act on the cup 33 to force the plug assembly correspondingly downwardly.

At its upper end, the rod 45 is threaded at 58 for engagement in the threaded bore 59 of a typical well tool recovery head 60 having a downwardly facing shoulder 61 adapted to be engaged by a suitable wire line fishing tool (not shown) when it is desired to release the plug B and pull the same from the tubing T, as will hereinafter be described.

Cooperative with he expander 39 for the purpose of anchoring the plug B in the tubing T, when released to do so, is the anchor means 24 which includes a circumferentially spaced wedgelike slip elements 62 having downwardly facing teeth 63 adapted to bite into the tubing T when the slips 62 are expanded. These slip elements have resilient arms 64 extending longitudinally of the lower body section 38, which are integral with a slip supporting ring 65 extending about the lower body 38. This ring 65 is initially retained against longitudinal movement with respect to the body 38 to hold the slip elements 62 out of wedged relation to the expander 39 and in retracted position, as shown in FIG. 3b. In order to retain the ring 65 against such movement, releasable latch means including ball detents 66 are provided, these balls 66 being disposed in radial holes 67 in the lower body 38 and engaged in an annular generally V-shaped groove 68 in the ring 65. A longitudinally shiftable latch rod 69 is disposed within the bore 70 of the lower body section 38, the rod 69 housing adjacent its upper end a cylindrical enlargement or head 71 positioned within or behind the balls 66 to hold the latter outwardly in the groove 68. Between the slip elements 62 and the ring 65, this body section 38 is provided with an external ring 72 providing a downwardly facing shoulder 73 in opposed spaced relation to the ring 65, this shoulder 73 being cooperative with the ring 65 in a manner hereinafter to be described.

Spring means including a helical compression spring 74 is provided to normally bias the slip 65 upwardly when the ball detents 66 are released. Thus, the upper end of the spring 74 abuts the slip ring 65, its lower end abutting an annular spring seat collar 75 affixed to the lower body 38 by suitable screw fasteners 76.

The actuator means 23 are provided for holding the cylindrical retaining portion 71 of the rod 69 in engagement with the ball detents 66, such means being operative to shift the rod 69 upwardly to remove the cylindrical portion 71 from the ball 66 when the plug B is to be anchored in the tubing T. This actuator means includes an upper or end member 77 threadedly connected, as at 78, to the lower end of the lower body section 38. The member 77 has a cylindrical downward extension 79 telescopically disposed about the upward cylindrical section 80 provided on a lower actuator member 81. These actuator members 77 and 81 are interconnected by a number of circumferentially spaced outwardly expandable bow springs 82. The upper end 83 of each bow spring is provided with a flange confined within an annular groove 84 in the member 77 by a retainer collar 85 secured to the end member 77 by suitable screw fasteners 86. The lower end 87 of each bow spring 82 is provided with a flange confined within a groove 88 in the lower actuator member 81 by a retainer collar 89 secured to the member 81 by a suitable screw fastener 90. Normally, the bow springs 82 will expand outwardly, causing telescopic contraction of the cylindrical extensions 79 and 80 of the members 77 and 81. However, when the bow springs are confined within the tubing T, they are elongated to effect telescopic contraction extension of the sections 79 and 80 of the actuator members 77 and 81 to the positions shown in FIG. 3b.

Extending downwardly from the actuator member 81 is a tubular body 91, this body 91 carrying a lower upwardly facing packer cup 92 bearing against an annular seat 93 on the body 91 and against a lower packing support collar 94 which is provided with an upwardly and outwardly extended end flange 95.

For purposes which will hereinafter appear, the packer support 94 is releasably latched to the actuator body 91. Accordingly, the body 91 is provided with a radial hole 96 in which a ball latch 97 is disposed. The ball 97 cooperates with a conical seat or recess 98 in the packer support 94, to hold the support 94 against downward displacement from the lower end of the body 91. The rod 69 previously referred to, and which holds the first-described ball detents 66 against displacement from the groove 68 of the slipring 65, also includes a cylindrical enlargement 99 adapted to engage the ball 97 of the second latch means to hold the latter in the seat 98. This cylindrical enlargement 99 also carries a side seal 100 sealingly engaged within the bore 101 of the actuator body 91.

At the base of the bore 101 of the actuator body 91 is a seat 102 against which the lower conical end 103 of the rod 69 is adapted to abut, to limit downward movement of the rod 69 within the lower body section 38 and the actuator body 91 to a position at which the cylindrical portions 71 and 99 of the rod 69 initially hold the respective ball detents 66 and 97 outwardly.

At its lower end, the actuator body 91 may be provided with a guide spear 104 threadedly attached thereto and having a conical guide surface 105 at its lower end. In addition, the lower end of the body 91 may be provided with ports 108 leading into the bore 101, to facilitate relative upward movement of the rod 69 in the bore 101 when the latch ball 97 is to be released.

A third latch means is provided in the tubing plug B which, as hereinafter will appear, is adapted to hold the rod 69 in upwardly displaced relation to the ball detents 66 and 97. This third latch means is incorporated in the upper actuator member 77, and includes a laterally shiftable latch dog 109 disposed in a radial bore 110 in the member 77 and confined therein by the retainer collar 85. This latch dog is normally biased inwardly by a coil compression spring 111 which engages the collar 85 and seats in a recess 112 in the outer end of the dog 109. The dog 109 engages an enlarged cylindrical section 113 on the rod 69, as shown in FIG. 3b, this cylindrical portion 113 having a lower downwardly facing shoulder 114 beneath which the dog 109 is adapted to engage to hold the rod 69 in an upper position within the body 38, 79 after the latch balls 66 have been released, and to enable the tool to be released from the tubing T and pulled upwardly therethrough to the top of the well bore.

Referring now more particularly to FIGS. 4a and 4b, the tubing plug assembly B is illustrated as anchored in the lower end of the tubing string T, in response to emergence of the bow springs 82 of the actuator members 23 from the lower end of the tubing T. In these views, it will be noted that the upper rod 45 has maintained its position with respect to the upper body section 30 and the intermediate body 32. Accordingly, the seal ring 57a still prevents communication between the upper bypass ports 54 and the lower bypass ports 55, and the enlarged cylindrical portion 44 at the lower end of the rod 45 is centrally located within the flexible webs 42, thereby maintaining the expander or cone 39 against upward movement relative to the intermediate body section 32. However, when the bow springs 82 emerge from the lower end of the tubing T into the larger diameter of the casing C, these springs are free to expand laterally outwardly and contract lengthwise, moving the actuator body 91 upwardly with respect to the lower body section 38, which moves the actuator rod 69 upwardly with it within the body section 38. Such upward movement of the rod 69 elevates the enlarged cylindrical portion 71 above the latch balls 66, thereby releasing the latch means which holds the slipring 65 against upward movement and permitting the spring 74 to expand and shift the slipring 65 and the slips 62 upwardly along the cone 39 and laterally outwardly into anchoring engagement with the tubing T, thus preventing further downward movement of the plug assembly B. Such anchoring of the plug assembly B will be indicated at the top of the well by an increase in the pressure of the following fluid being pumped downwardly through the tubing string T, since the fluid cannot bypass through the ports 54 and 55.

In addition, upward movement of the rod 69 within the body section 38, as shown in FIG. 4b, moves the downwardly facing shoulder 114 on the cylindrical enlargement 113 of the rod 69 above the latch dog 109, the latter being shifted inwardly by the spring 111 under the shoulder 114 to prevent return downward movement of the rod 69 to its initial position.

The plug assembly B will remain anchored in the tubing T under these circumstances until the plug is positively released. While the plug B remains anchored, the cement slurry, which has been displaced into the formation or zone Z1, will be held immobile to allow it to set up to plug off that formation by maintaining pressure on the fluid in the tubing string T above the plug assembly B.

When it is desired to release and remove the plug assembly from the tubing T, such result can be effected by either pushing the plug downwardly and out of the tubing, or by pulling it upwardly through the tubing to the top of the well bore. Release by pushing downwardly is illustrated in FIGS. 5a, 5b and 5c, release by pulling upwardly through the tubing being illustrated in FIGS. 6a, 6b and 6c.

As disclosed in FIGS. 5a to 5c, the tubing plug assembly B is released by applying a downward force to the recovery head 60 (not shown in FIG. 5a) by a suitable jarring apparatus on a wire line (not shown), which is transmitted to the center rod 45 to shear the ring 48 and effect downward movement of the rod 45. Such downward movement of the rod serves the purpose of moving the lower cylindrical portion 44 of the rod 45 downwardly within the flexible webs 42 from its position behind the cone 39, so that the webs 42 are free to flex inwardly in response to downward movement of the upper body section 30 and the intermediate body section 32. This downward movement is caused by engagement of the enlarged cylindrical portion 56a of the rod with the upwardly facing shoulder 56b in the body section 32, downward movement of the body section 32 causing the webs 42 to be cammed inwardly by the downwardly tapered lower surfaces 41a of the web projections 41. Following such inward deflection of the web 42, the downward-wedging action of the expander 39 on the slips is relieved, so that the expander 39 is no longer in condition to retain the slips 62 anchored against the wall of the tubing T. The downward movement of the body sections 30, 32, 38 causes engagement of a ring 72 on the lower body section 38 with the ring 65 to urge the latter downwardly and free the slips from wedging relation to the expander 39.

The downward application of force on the rod 45 and body of the tool is continued until the entire plug is ejected downwardly from the tubing T, whereupon it will drop or gravitate to the top plug F. During the downward movement of the plug and its ejection from the tubing T, the bypass ports 54, 55 are in communication, since the cylindrical portion 56a and its seal ring 57a have been lowered below the ports 55, allowing fluid to bypass around the upper packing cup 33.

As illustrated in FIGS. 6a, 6b and 6c, the tubing plug B can be released from its anchored position in the well casing and elevated through the tubing T to the top of the well. By use of a suitable retrieving tool (not shown) lowered in the tubing on a wire line (not shown), such retrieving head engages the recovery head 60 and latches under its downwardly facing shoulder 61, in a known manner. An upward jar is taken on the wire line to jar upwardly on the rod 65, which shears the ring 48 and moves the rod 45 upwardly within the body of the tool, until the enlargement 56a engages the split retainer ring 52, as disclosed in FIG. 6a. With the rod in this condition, the ports 54 and 55 are in communication with each other through the interior of the body section 30 and 32, permitting fluid to bypass around the upper packing cup 33. Accordingly, upward movement of the wire line and rod 45 connected thereto will raise the body sections and the entire tool, including the expander 39, the latch 109 elevating the rod 69 with the spring 74 yieldably urging the slips 62 in an upward direction. However, such slips will merely ride along the wall of the tubing T, since the downwardly tapering expander 39 is being elevated therefrom. Also, during the initial stage of the elevating movement, the rod 69 is also being elevated, as well as the bowed springs 62. When the bowed springs move upwardly into the casing, they are compressed, shifting the actuator body 91 downwardly with respect to the lower body section 38 and the rod 69, including its enlargement 99, the downward movement of the body 91 along the cylindrical enlargement 99 removing the detent ball 97 from engagement therewith, permitting it to drop out of the socket 98 in the plug support 94, and thereby freeing the lower packing cup 92 and its support 94 from the body 91. As upward movement of the plug continues, the packing cup 92 will tend to reenter the tubing T, but the fluid column in the tubing will act downwardly on the packing cup 92 and shift the latter, together with its support 94, from the lower end of the actuator body 91, the packing cup 92 and actuator body 91 dropping down into the well casing. The remainder of the plug assembly B is now free to be moved upwardly through the tubing string T to the top of the well by appropriately elevating the wire line, the slips 62 merely sliding upwardly along the wall of the tubing string.

I claim:

1. The method of cementing a well bore in which a tubing string is disposed: introducing a body of cement slurry into said tubing string, said tubing string having an unrestricted bore extending from at least the point of introducing the cement slurry to the lowermost end of the tubing string, introducing a column of following fluid into said tubing string above said slurry, said column of following fluid having an arresting plug in said tubing string a predetermined distance above said cement slurry with a predetermined quantity of following fluid between said plug and cement slurry, the remainder of said following fluid being above said plug, forcing said column of following fluid down the tubing string to force said slurry from the lower end of said tubing string and into the well bore below said tubing string followed by said predetermined quantity of following fluid, and positively stopping said arresting plug in the lower end of said tubing string to prevent ejecting of the remainder of said following fluid in said tubing string above said plug into the well bore.

2. The method of claim 1, including placing a divider plug in the tubing string between said cement slurry and the fluid in advance of said cement slurry.

3. The method of claim 1, including placing a divider plug in the tubing string between said cement slurry and the fluid in advance of said cement slurry, and also placing a divider plug in the tubing string between said cement slurry and the following fluid behind said cement slurry, said last-mentioned divider plug being located in the tubing string a predetermined distance in advance of said arresting plug to confine said predetermined quantity of following fluid therebetween.

4. The method of claim 1 wherein said arresting plug is positively stopped in the lower end of said tubing string in response to emergence of the lower end of said arresting plug from the lower end of said tubing string.

5. The method of cementing a well bore containing a well casing in which a tubing string is disposed: introducing a body of cement slurry into said tubing string, displacing said body of cement slurry downwardly in said tubing string by a column of following fluid above said cement slurry, forcing said cement slurry from the lower end of said tubing string and into the well casing below said tubing string, plugging the lower end of said tubing string to prevent further movement of said cement slurry into said well casing below the lower end of said tubing string, wherein said tubing string is plugged by placing a plug in the column of fluid a predetermined distance above said cement slurry, and anchoring said plug in said tubing string in response to emergence of the lower end of said plug from said tubing string.

6. The method of claim 5, including allowing said slurry to set up and then removing said plug from said tubing string.

7. The method of claim 5, including allowing said slurry to set up, and then retrieving said plug upwardly through said tubing string.

* * * * *